Figure 1:
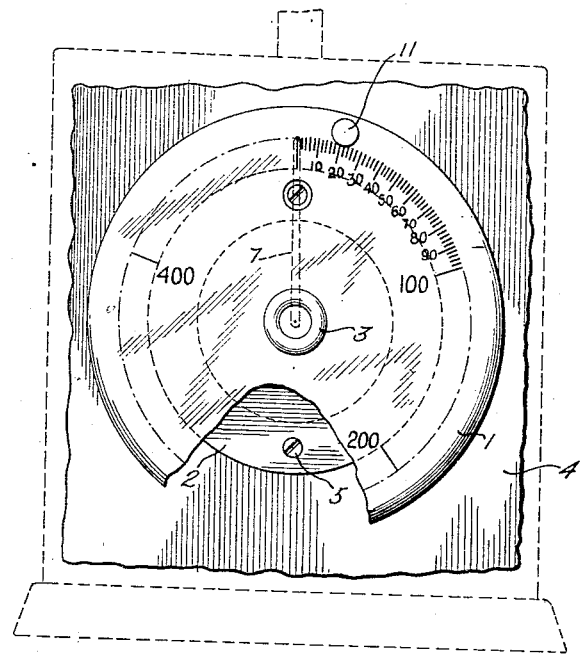

May 12, 1925.

G. E. CHATILLON 1,537,158

WEIGHING DEVICE

Filed Sept. 7, 1923

INVENTOR
George E. Chatillon
BY
John W. Thompson
his ATTORNEY

Patented May 12, 1925.

1,537,158

UNITED STATES PATENT OFFICE.

GEORGE E. CHATILLON, OF NEW YORK, N. Y.

WEIGHING DEVICE.

Application filed September 7, 1923. Serial No. 661,350.

*To all whom it may concern:*

Be it known that I, GEORGE E. CHATILLON, a citizen of the United States, and a resident of the borough of Manhattan, city, county, and State of New York, have invented an Improvement in Weighing Devices, of which the following is a specification.

The present invention relates to an improvement in weighing devices and more particularly to that type in which the face plate bearing the scale markings is movable or rotatable with respect to the indicator or pointer. Scales of this type are commonly employed where predetermined amounts of different ingredients are intended to be weighed and combined on the pan or platform of the scale. In the operation of these scales, the required amount of one ingredient is deposited and then the face plate is rotated so that the zero marking will be advanced to the position of the indicator while the material is in place on the scale. Then the next ingredient will be added and the zero marking advanced in a similar manner in case one or more additional ingredients are to be added. It has been found in practice that, after such a scale has been used extensively, the rotatable face plate becomes loosened on its mounting and it is therefore difficult to maintain said plate in the different zero positions required. The purpose of my invention is to supply the additional friction necessary to overcome this difficulty.

One embodiment of my invention is illustrated in the drawings accompanying the present specification, and in which—

Figure 2:
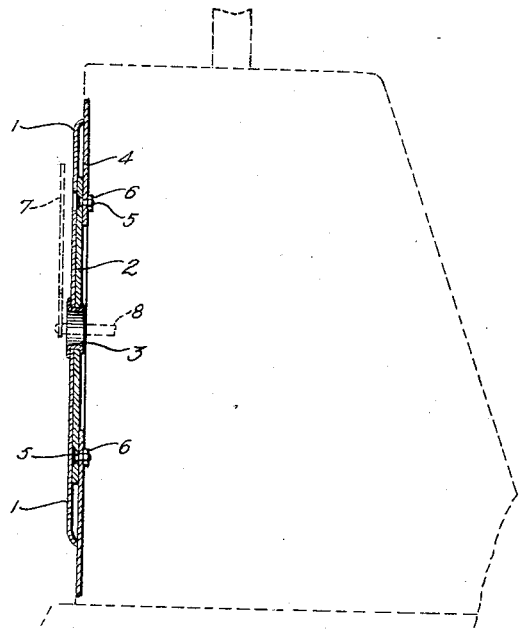

Figure 1 is a front view in elevation of a weighing device having a portion of the face plate cut away, Figure 2, a central vertical section thereof.

The drawings indicate a weighing device having a face plate 1 secured to a end plate 2 by means of an eyelet or similar device 3, whereby the face plate is held in frictional engagement with the end plate 2 and is free to rotate with respect to said end plate, the latter being secured to the framework 4 of the weighing device by suitable means such as a bolt 5 and a nut 6. An indicator or pointer 7 is mounted on a shaft 8 connected with the beams or other deflecting portions of the scale mechanism, not shown, said shaft 8 being rotatable to a predetermined degree, depending upon the weight applied to the beams. Obviously, the free end of the pointer 7 is correspondingly deflected. The face plate 1 is preferably of dished shape, having its peripheral edges turned or bent toward the framework 4 in such a manner as to engage the surfaces of said framework frictionally so as to resist motion of rotation, said frictional resistance supplementing that provided by means of the eyelet or hollow rivet 3.

From the foregoing description, it will be clear that in the preferred form of device in which the face plate is deformed rearwardly or dished, the peripheral edge will bear against the framework of the measuring device and thereby supply additional friction resistance to the movement of the face plate which is commonly rotated from one position to the next by means of a thumb piece 11.

I claim as my invention:

In an adjustable zero weighing device, the combination of a frame having an opening, an indicator supporting shaft extending through said opening, a dished dial disc concentric with said shaft, and means for securing said disc in rotatable relation to the frame including a supporting plate attached to the frame and an eyelet concentric with said shaft and passing through said plate and said disc to retain peripheral portions of the disc in yielding engagement with the frame.

In testimony whereof, I have signed my name to this specification this 30th day of August, 1923.

GEORGE E. CHATILLON.